Nov. 1, 1960 W. V. TRAEGER 2,958,257

METHOD FOR THE PRODUCTION OF ANIMATED PICTURES

Filed May 15, 1958 4 Sheets-Sheet 1

INVENTOR

William V. Traeger

BY [signature]

ATTORNEY

METHOD FOR THE PRODUCTION OF ANIMATED PICTURES

Filed May 15, 1958

INVENTOR

William V. Traeger

BY Hastings Ackley

ATTORNEY

Nov. 1, 1960 W. V. TRAEGER 2,958,257

METHOD FOR THE PRODUCTION OF ANIMATED PICTURES

Filed May 15, 1958 4 Sheets-Sheet 3

INVENTOR

William V. Traeger

BY Hastings Ackley

ATTORNEY

Nov. 1, 1960 W. V. TRAEGER 2,958,257

METHOD FOR THE PRODUCTION OF ANIMATED PICTURES

Filed May 15, 1958

4 Sheets-Sheet 4

INVENTOR

William V. Traeger

BY Hastings Ashley

ATTORNEY

United States Patent Office 2,958,257

Patented Nov. 1, 1960

2,958,257

METHOD FOR THE PRODUCTION OF ANIMATED PICTURES

William V. Traeger, Dallas, Tex., assignor to Otis Engineering Corporation, Dallas, Tex., a corporation of Texas Filed May 15, 1958, Ser. No. 735,489

12 Claims. (Cl. 88—16)

This invention relates to an improved method for the production of animated pictures and more particularly to an improved method for the production of animated pictures employing animation overlays and to a new and improved method of producing overlays.

An object of this invention is to provide a new and improved method for producing animated pictures.

Another object of the invention is to provide a new and improved method for producing animated pictures employing transparent overlays which are assembled in juxtaposition in registered positions and photographed or otherwise reproduced to produce a composite picture.

Still another object is to provide a new and improved method of producing animated pictures wherein each of the overlays has different parts reproduced thereon.

A further object of the invention is to provide a new and improved method for producing animation overlays wherein each overlay showing a movable part is produced by detachably attaching a cutout of the moving part to a master drawing in proper position thereon and photographing or otherwise reproducing the combination of the cutout of the moving part and the master drawing to produce the overlay which shows only the moving part in the proper position, the reproducing means being insensitive to the master drawing.

A still further object is to provide a new and improved method of producing animation overlays which includes producing a master drawing of the device to be animated indicating the various positions the movable parts assume during the operation; preparing several copies of the master drawing on translucent material, the copies of the master drawing being transparent to transmit ultra-violet light, such as is used in blueprint machines; temporarily attaching cutouts of certain of the moving parts to one of the transparent copies of the master drawing in one of the various positions assumed by such moving parts; making a transparent overlay reproduction of the cutout in position on the copy of the master drawing; assemblying a plurality of the overlays each showing different individual parts in the selected positions and photographing or otherwise reproducing the composite picture formed by the plurality of overlays.

A still further object is to provide a new and improved method of producing animation overlays in which the means for producing the overlays of the cutouts on the copies of the master drawing reproduces the various moving parts represented by the cutouts in different colors, such as by use of diazo-sensitized films which produce brilliant colored dye-images on a clear transparent plastic base whereby when the plurality of juxtaposed overlays, each showing different parts in different colors, are photographed using color sensitive film the resulting photograph will show the different parts in different colors.

A still further object is to provide a new and improved method of producing animated pictures wherein the non-movable parts are reproduced on a transparent overlay whereby the juxtaposed overlays may be backlighted.

A still further object is to provide a new and improved method of producing animated overlays wherein the juxtaposed overlays are placed in registry over an opaque light reflecting surface whereby they may be photographed using direct light, the images of moving parts on the overlays being coated on one side with opaque, preferably light reflecting material in order to prevent background objects from showing through prior transparent overlays.

Still another object is to provide a new and improved method of producing animated pictures which includes the positioning of a plurality of transparent overlays, each bearing one or more colored images of selected parts in registering superposed relationship and photographing the juxtaposed overlays to produce a composite picture showing the various parts in proper relationship to one another.

A still further object of the invention is to provide a new and improved method of producing animated pictures wherein overlapping portions of the images of different overlays are removed in order to prevent undesirable color differentiations in the composite picture due to filtering out of color light by passage through overlapping portions of two different colored images of different overlays.

Additional objects and advantages of the invention will be readily apparent from the reading of the following description of a device constructed in accordance with the invention, and reference to the accompanying drawings thereof, wherein.

Figure 1:
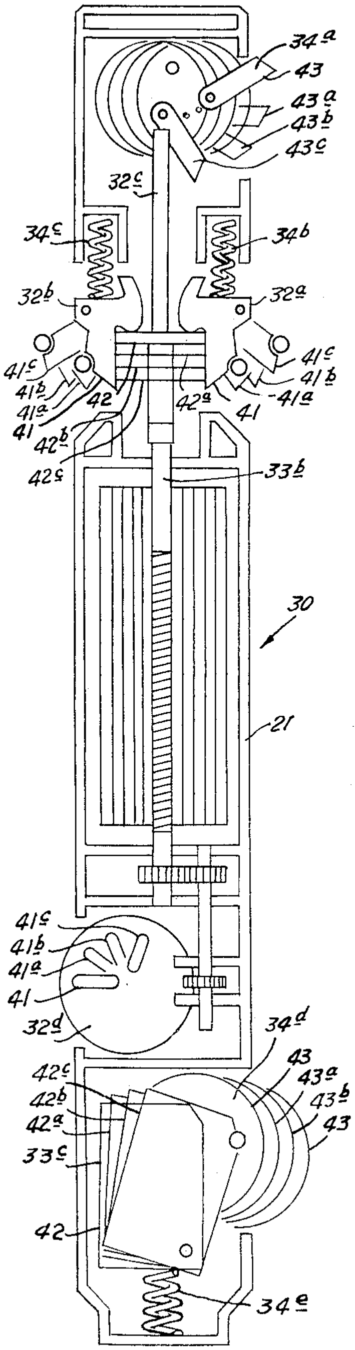
Figure 1 is the master drawing of a device having movable and stationary parts and indicating the various positions of the moving parts assumed by such parts during each cycle of operation of the device.
Figure 2:
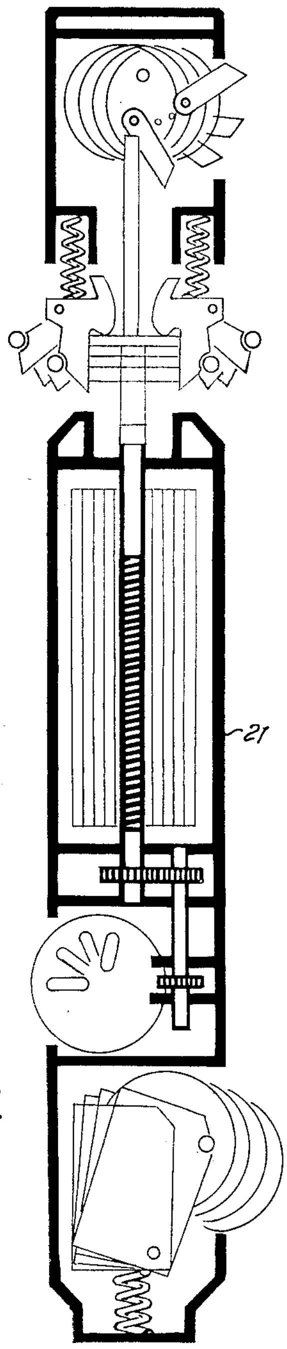
Figure 2 is a translucent copy of the master drawing having stationary parts made opaque.

Referring now particularly to Figure 1 of the drawing, the device 30 includes a stationary or non-movable housing 21, movable parts 32*a*, 32*b*, 32*c* and 32*d* which are to be shown in one color, such as red, movable parts 33*a*, 33*b* and 33*c* which are to be shown in another color, such as yellow, and movable parts 34*a*, 34*b*, 34*c*, 34*d* and 34*e* which are to be shown in still another color, such as blue. The master drawing shown in Figure 1 has indicated thereon several different positions assumed by each movable part during the cycle of operation of the machine. It will be seen that the sequential positions of the parts 32*a*, 32*b*, 32*c* and 32*d* are indicated by the lines 41*a*, 41*b*, 41*c* and 41*d*. The corresponding positions of the parts 33*a*, 33*b* and 33*c* are indicated by the lines 42*a*, 42*b* and 42*c*. Similarly, the corresponding positions of the parts 34*a*, 34*b*, 34*c* and 34*d* are indicated by the lines 43*a*, 43*b* and 43*c*.

Figure 7:
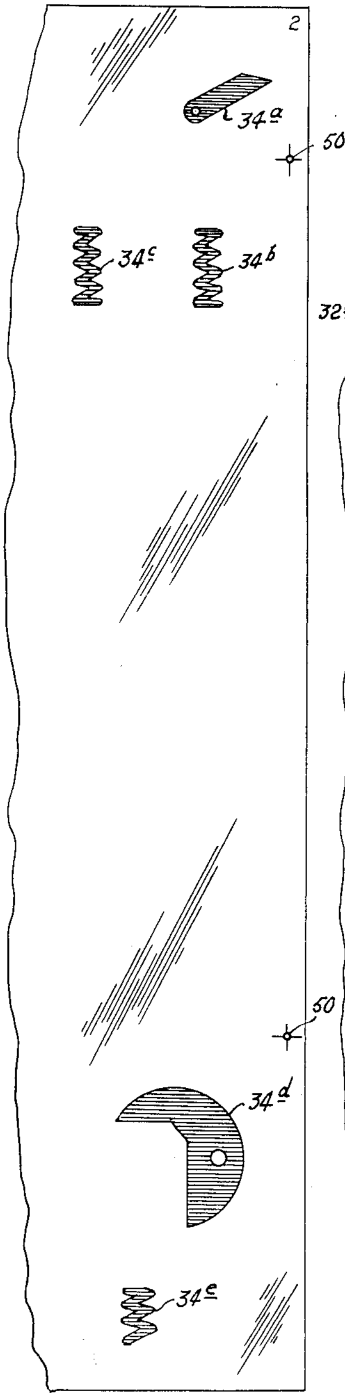
Figures 7, 8 and 9 are ilustrations of the overlays produced by reproducing or photographing the copies of the master drawing with the cutouts of movable parts detachably attached thereto shown in Figures 4, 5 and 6.
Figure 8:
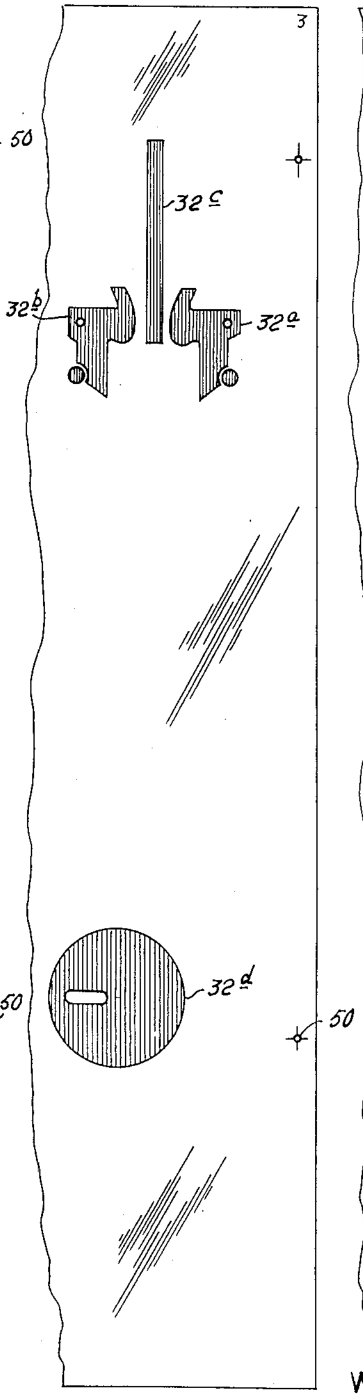
Figure 9:
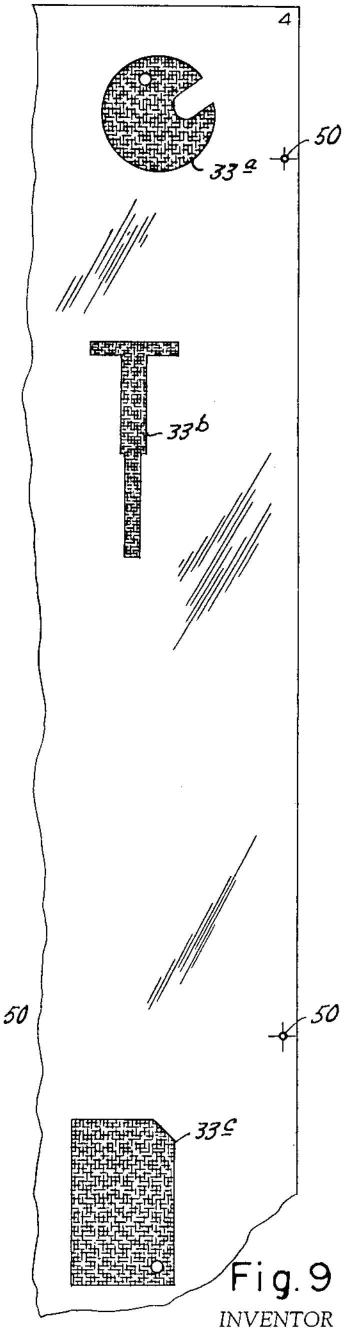
Figures 10, 11:
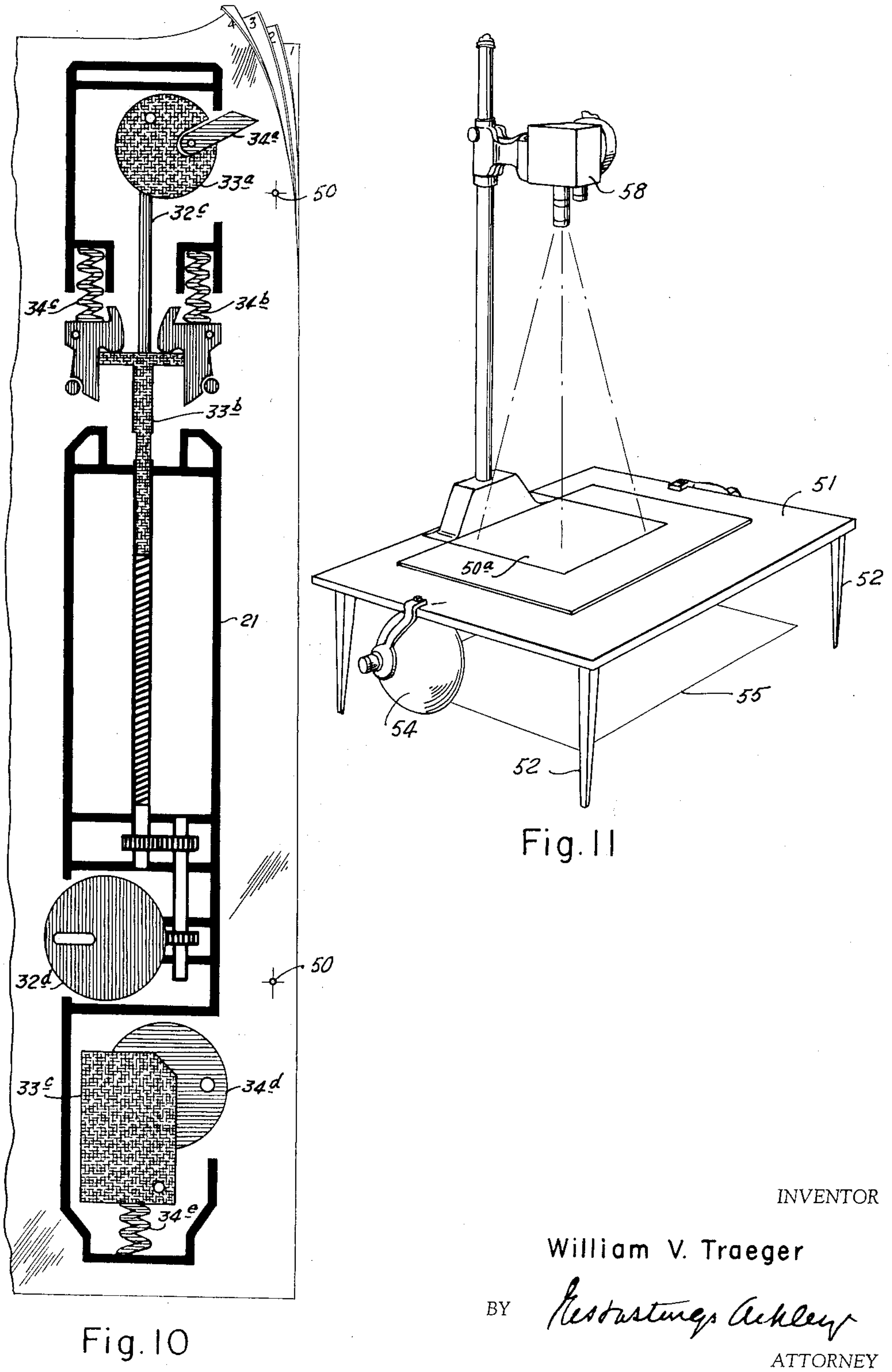
Figure 10 is a composite picture or reproduction produced by photographing or otherwise reproducing the juxtaposed overlays shown in Figures 3, 7, 8 and 9.
Figure 11 is a perspective view of a photographing set up for photographing composite pictures of the assembled juxtaposed overlays.

Cutouts of the various movable parts may thus be placed in the positions indicated by the lines 41, 42 and 43 on different transparent copies of the master drawing in order that reproductions on transparent sheets or overlays showing the different movable parts of the device 30 may be produced, as shown in Figures 7, 8 and 9, to show the different positions assumed by each movable part without requiring a separate drawing of each such part in each of the several positions that it assumes during each cycle of operation of the device 30.

Figure 3:
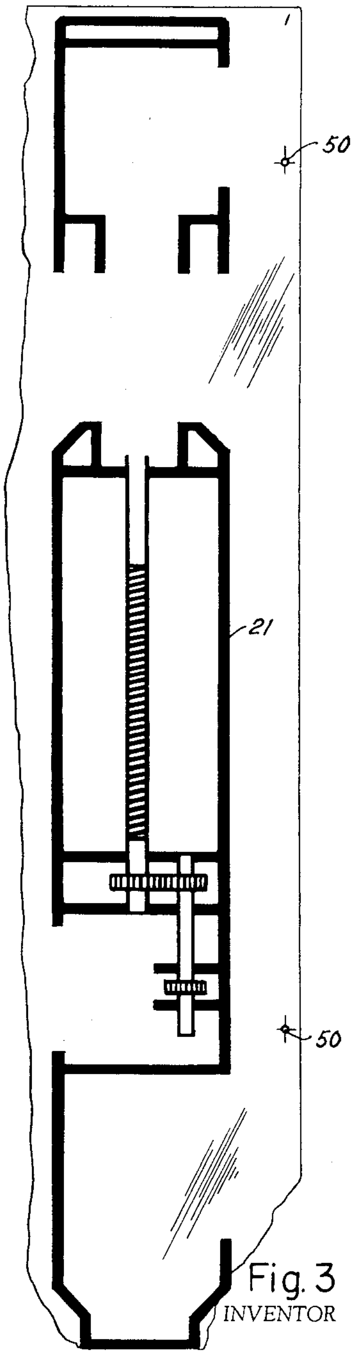
Figure 3 shows a background overlay produced by reproducing the drawing of Fig. 2.
Figure 4:
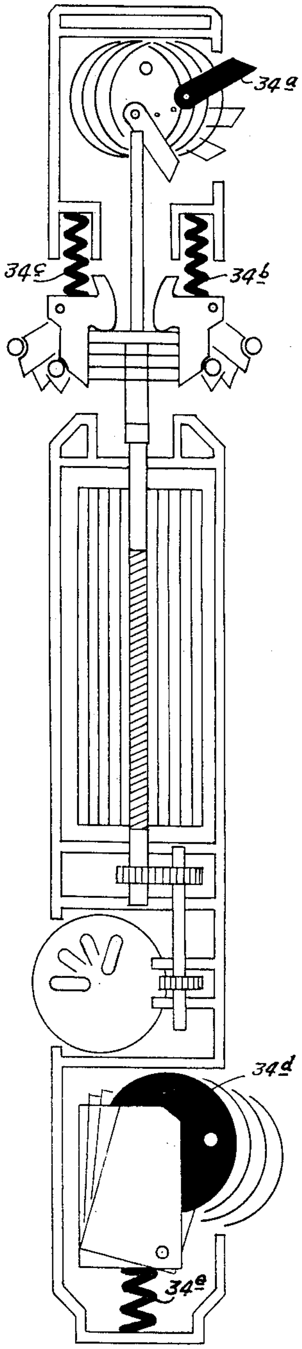
Figures 4, 5 and 6 are copies of the master drawing illustrated in the Figure 1 with opaque cutouts of different movable parts positioned thereon.
Figure 5:
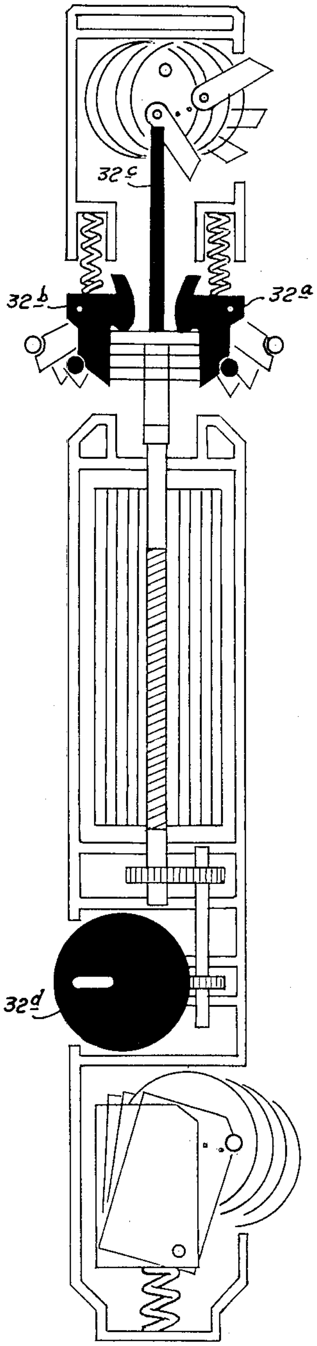
Figure 6:
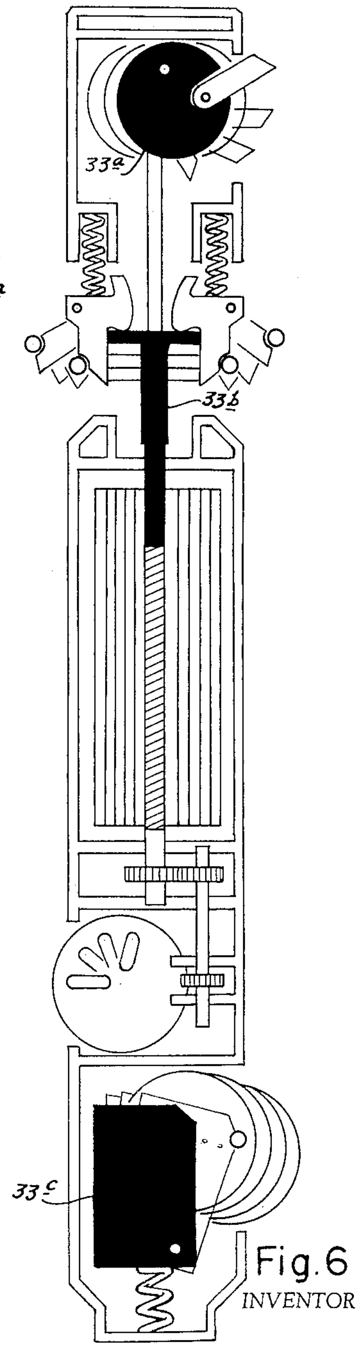

The master drawing of the device 30 as shown in Figure 1 is preferably made on translucent material with the lines of the drawing opaque to the light to be transmitted. In this case the light employed in reproducing the master drawing is ultra-violet so that the lines of the drawing are opaque to ultra-violet light. Preferably several copies of the master drawing shown in Figure 1 are then made by any suitable process, such as a blueprint process, whereby the lines of the drawing are not opaque but are transparent to transmitted ultra-violet light. One of the copies of the master drawing of Figure 1 is then used to prepare the drawing shown in Figure 3 by making the stationary parts 31 opaque by any suitable means, such as over-inking with India ink. Still other copies are over-inked with India ink or other opaque material to cause the movable parts 32, 33 and 34 to be opaque. The copies of the master drawing on which different parts have been opaqued as shown in Figures 2, 4, 5 and 6 are reproduced to make the reproductions. The reproduction shown in Figure 3 is then the background overlay and is used as the background overlay since it shows only the stationary parts of the device 30. The reproductions of the master drawing with movable parts made opaque are then employed to make opaque cutouts of the various movable parts.

The cutouts of the movable parts 32 are then temporarily attached by any suitable means, such as an adhesive, to one of the copies of the master drawing in the first of their positions, such as indicated by lines 41. The parts 33 which are of yellow color, are fixed in a similar manner to another copy of the master drawing 1 in the position indicated by lines 42 while the cutouts of the parts 34 are positioned on still another copy of the master drawing Figure 1 in the positions indicated by lines 43. Each of the copies of the master Figure 1 with the corresponding cutouts of the moving parts 32, 33 and 34 attached thereto in corresponding positions is then reproduced to form the overlays shown in Figures 7, 8 and 9. The overlays are produced by use of different diazo-sensitized films whereby the movable parts 32 shown in the overlay of Figure 8 are reproduced in red, the movable parts 33 of the overlay shown in Figure 9 are reproduced in yellow and the movable parts 34 of the overlay shown in Figure 7 are reproduced in blue.

The copies of the master drawing are preferably provided with indexing means, such as the cross-marks 50, so that the overlays shown in Figures 3, 7, 8 and 9 may be properly positioned in registry. A composite color photograph may then be taken of the superposed overlays shown in Figures 3, 7, 8 and 9 by laying them in proper registry, achieved by use of the registering marks 50 on a suitable support, such as a ground glass **50*a* disposed over a suitable aperture in a platform 51, supported by legs or standards 52. The colored images of the moving parts are translucent whereby back lighting produced by projecting light from a bulb or other light producing means 54 may be reflected from the reflector 55 through the aperture in the platform and the overlays to reproducing device, such as a camera 58, which is provided with a suitable shutter whereby each frame of the roll of film in the camera may be exposed individually by actuation of a suitable shutter mechanism. The group of superposed overlays is then photographed on one frame of the film in the camera 58. The group of overlays, except the bottom overlay as shown in Figure 3, are then removed and another group of overlays showing the movable parts in the positions indicated by the lines 41*a*, 42*a* and 43*a* are again placed in juxtaposed relation on the overlay of the fixed or immovable parts and the next frame of the film is exposed. A different overlay for each position of the movable parts 32, 33 or 34 is produced and photographed in proper sequence on the strip of film contained in the camera 58. The resulting film produces an animated colored picture of the device 30** in operation.

While the overlays of the movable parts were described as showing the different movable parts in different colors, it will be obvious that if desired all parts could be black or any single other suitable color. Obviously, if all parts were black, the number of overlays needed may be substantially reduced in some cases to only two, that is, the background overlays showing the stationary parts and a second overlay showing the movable parts in different positions for each frame of the moving picture film.

It will now be apparent that a new and improved method of producing animated pictures has been illustrated and described which includes producing a master drawing showing the different positions assumed by the movable parts of a device, object or figure, making several non-reproducible copies of the master drawing, making cutouts or representations of the movable parts, making a background overlay showing only the stationary parts, making a plurality of overlays showing the progressively different positions assumed by the differently colored movable parts of the device by positioning the cutouts of the movable parts on copies of the master drawing in the positions indicated on the master drawing, juxtaposing the corresponding sets of overlays in registry, and photographing the juxtaposed overlays to produce a series of pictures showing the movable parts in sequentially changing positions whereby an animated picture is produced.

It will be apparent that the only artistic skill needed is in the making of the master drawing and that all succeeding steps of the method may be performed by persons having little skill.

It will further be seen that the above described and illustrated method of producing animated pictures employs simple reproducing means, such as a blueprint machine and a camera.

In the event that two or more of the movable parts in any of the positions they assume during the cycle of operation of the device 30 overlap each other, the light trans-reflected from the reflecting surface 52 must pass through portions of two images of two overlays which, if they are of different colors, cause the resulting picture or frame of the film strip in the camera to have a third color. For example, if a movable portion illustrated in red in one overlay overlaps another movable part illustrated in brown in another overlay, the overlapped portions will photograph dark brown or some other color other than brown or red. To overcome this undesired result the method of preparing the overlays of the movable parts may be as follows:

The lowermost overlay which is overlapped by a colored portion indicating a different part on an upper overlay may be either erased or removed by use of suitable solids or the overlapped portion may be painted over with the same color as the portion of the colored part of the upper overlay so that overlapping portions of different parts on different overlays will be of the same color and thus cause the resulting composite picture to have the overlapping portion the same color as the part overlapping the lower part of the lower overlay.

In the event that direct lighting is desired for the production of the animated pictures, the superposed overlays for each frame of the film strip are placed on a reflecting surface, such as a white mat surface or an aluminized surface. In this case the colored portions or images of the overlays which represent the different parts of the device are coated on their back sides with a reflecting opaque substance wherever it is desired to eliminate the transparency through the overlay. The light source 54 is moved over the platform to cause the light to impinge directly onto the overlays and be reflected back to the camera 58.

It will further be seen that the individual overlays are made by use of diazo-sensitized films so that each overlay has the images reproduced thereon in a single color which is preferably different from the colors of the images reproduced in the other overlays, whereby even though the cutouts are all black in color, the reproductions thereof or overlays formed by reproducing the cutouts in proper positions on the copies of the master drawing are in color.

It will be further seen that the overlays may be made by use of conventional ammonia blueprint machines by placing the diazo-sensitized film over a translucent copy of the master drawing in which the various parts have either been opaqued, as in the case of the stationary parts, or to which opaque cutouts of the various movable parts have been detachably secured, and then passing the film and the copy of the so altered master drawing through the blueprint machine.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A method of making animated pictures comprising: producing a reproducible master drawing of a figure, indicating on the master drawing the different positions assumed by the different movable parts of the figure, making a plurality of non-reproducible copies of the master drawing, making reproducible certain parts on each of the non-reproducible copies of the master drawing, making reproductions on transparent sheets of each of the copies of the master drawing whereby each of said transparent sheet has images of only selected parts of the figure, placing the transparent sheets in registering superposed positions, and photographing the juxtaposed transparent sheets.

2. A method of producing animated pictures comprising: producing a reproducible master drawing showing a figure and indicating the different positions assumed different movable parts of the figure, making a plurality of non-reproducible copies of the master drawing, making cutouts from one of the copies of the master drawing of the movable parts of the figure, making said cutouts reproducible, placing the reproducible cutouts on a copy of the master drawing in each of the indicated different positions, placing corresponding overlays of different parts in corresponding positions in juxtaposed registering positions and reproducing the juxtaposed overlays to form a plurality of composite pictures, different pictures showing the figure with its movable parts in different positions.

3. A method of making animated pictures comprising: producing a reproducible master drawing indicating the different positions assumed by different portions of the figure, making a plurality of non-reproducible copies of the master drawing, rendering reproducible selected parts of the figure on different non-reproducible copies of the drawing, making cutouts of the movable parts from the copies of the master drawings, positioning cutouts of the parts which are to be reproduced in like colors on a non-reproducible copy of the master drawing in each of the indicated positions assumed by such parts, and making reproductions on transparent sheets of said indicated parts in each such positions wherein the transparent sheets show such movable parts as colored images thereon.

4. A method of making animated pictures comprising: producing a reproducible master drawing indicating the different positions assumed by different portions of the figure, making a plurality of non-reproducible copies of the master drawing, rendering reproducible selected parts of the figure on different non-reproducible copies of the drawing, making cutouts of the movable parts from the copies of the master drawings, positioning cutouts of the parts which are to be reproduced in like colors on a non-reproducible copy of the master drawing in each of the indicated positions assumed by such parts, and making reproductions on transparent sheets of such parts in each of such positions wherein the transparent sheets show such movable parts as colored images thereon, placing transparent sheets bearing images of different parts in different colors in juxtaposition and photographing the juxtaposed overlays to produce a plurality of composite colored pictures, different pictures showing the figure with its movable parts in different positions.

5. A method of making animated pictures comprising: producing a reproducible master drawing indicating the different positions assumed by different portions of the figure, making a plurality of non-reproducible copies of the master drawing, rendering reproducible selected parts of the figure on different non-reproducible copies of the drawing, making cutouts of the movable parts from the copies of the master drawings, positioning cutouts of the parts which are to be reproduced in like colors on a non-reproducible copy of the master drawing in each of the indicated positions assumed by such parts, making reproductions on transparent sheets of said indicated parts in each of such positions wherein the transparent sheets show such movable parts as colored images thereon, placing transparent sheets bearing images of different parts in different colors in juxtaposition and photographing the juxtaposed overlays to produce a plurality of composite colored pictures, different pictures showing the figure with its movable parts in different positions, said transparent sheets being diazo-sensitized films.

6. A method of making animated pictures comprising: producing a reproducible master drawing of a figure, indicating on the master drawing the different positions assumed by the different movable parts of the figure, making a plurality of non-reproducible copies of the master drawing, making reproducible certain parts on each of the non-reproducible copies of the master drawing, making reproductions on transparent sheets of each of the copies of the master drawing whereby each has colored images of only selected parts of the figure, placing the transparent sheets in registry in superposed positions, and photographing in color the superposed overlays.

7. A method of producing animated pictures comprising: producing a reproducible master drawing showing a figure and indicating on the master drawing the different positions assumed by different movable parts of the figure, making several non-reproducible copies of the master drawing, placing reproducible cutouts of different parts which are to be shown in the same color on a copy of the master drawing in the different positions indicated on the master drawing, making reproductions on transparent sheets each having colored images of such parts in said indicated different positions, placing corresponding reproductions on transparent sheets of different parts in juxtaposed registering positions, and reproducing the juxtaposed transparent sheets to form composite color pictures.

8. The method of claim 7, wherein the images are translucent whereby the juxtaposed reproductions on transparent sheets may be photographed by backlighting.

9. The method of claim 7 wherein the colored images are backed by opaque reflecting means whereby the juxtaposed overlays may be photographed by direct lighting.

10. The method of claim 8 wherein overlapped portions of images of lower transparent sheets are removed from said transparent sheets to prevent improper representation of the overlapping images.

11. A method of making animated pictures comprising: producing a reproducible master drawing indicating the different positions assumed by different portions of a figure, making a plurality of non-reproducible copies of the master drawing, rendering reproducible selected parts of the figure on different non-reproducible copies of the drawing, and making reproductions on transparent sheets of each of the copies of the master drawing whereby each transparent sheet has colored images of only selected parts of the figure by superposing a diazo-sensitized film on each of the copies of the master drawing and processing the film with such copy through an ammonia type ultra-violet ray blueprint machine.

12. A method of making animated pictures comprising: producing a reproducible master drawing indicating the different positions assumed by different portions of the figure, making a plurality of non-reproducible copies of the master drawing, rendering reproducible selected parts of the figure on different non-reproducible copies of the drawing, and making reproductions on transparent sheets of each of the copies of the master drawing whereby each transparent sheet has colored images of only selected parts of the figure by superposing a diazo-sensitized film on each of the copies of the master drawing and processing the films with such copies through an ammonia type ultra-violet ray blueprint machine, placing the processed films in registering superposed positions, and photographing the processed film overlays.

References Cited in the file of this patent

UNITED STATES PATENTS

| | | |
|---|---|---|
| 1,270,369 | Bishop | June 25, 1918 |
| 1,385,354 | Ayres | July 26, 1921 |
| 1,715,127 | Goldman | May 28, 1929 |
| 1,760,156 | Mann | May 27, 1930 |
| 2,091,144 | Freil | Aug. 24, 1937 |

FOREIGN PATENTS

| | | |
|---|---|---|
| 221,564 | Great Britain | Sept. 15, 1924 |